Jan. 1, 1963 | P. G. ZAGAR ETAL | 3,070,970

APPARATUS AND METHOD FOR COOLING FINELY DIVIDED SOLID PARTICLES

Filed Aug. 7, 1959 | 7 Sheets-Sheet 1

INVENTORS
Peter G. Zagar, Robert H. Burns
Dante Falcioni, John C. Kleiber
BY
James E. Toomey
ATTORNEY Jan. 1, 1963 P. G. ZAGAR ETAL 3,070,970

APPARATUS AND METHOD FOR COOLING FINELY DIVIDED SOLID PARTICLES

Filed Aug. 7, 1959 7 Sheets-Sheet 2

INVENTORS
Peter G. Zagar, Robert H. Burns
Dante Falcioni, John C. Kleiber
BY
James E. Toomey
ATTORNEY Jan. 1, 1963

P. G. ZAGAR ETAL 3,070,970

APPARATUS AND METHOD FOR COOLING FINELY DIVIDED SOLID PARTICLES

Filed Aug. 7, 1959

7 Sheets-Sheet 3

INVENTORS
PETER D. ZAGAR, ROBERT H. BURNS
DANTE FALCIONI, JOHN C. KLEIBER
BY
James E. Toomey
ATTORNEY Jan. 1, 1963 P. G. ZAGAR ET AL 3,070,970

APPARATUS AND METHOD FOR COOLING FINELY DIVIDED SOLID PARTICLES

Filed Aug. 7, 1959 7 Sheets-Sheet 4

INVENTORS
Peter G. Zagar, Robert H. Burns
Dante Falcioni, John C. Kleiber
BY
James E. Toomey
ATTORNEY INVENTORS
Peter G. Zagar, Robert H. Burns
Dante Falcioni, John C. Kleiber
BY
James E. Toomey
ATTORNEY Jan. 1, 1963

P. G. ZAGAR ETAL 3,070,970

APPARATUS AND METHOD FOR COOLING FINELY DIVIDED SOLID PARTICLES

Filed Aug. 7, 1959

7 Sheets-Sheet 6

INVENTORS
Peter G. Zagar, Robert H. Burns
Dante Falcioni, John C. Kleiber
BY
James E. Toomey
ATTORNEY INVENTORS
Peter G. Zagar, Robert H. Burns
Dante Falcioni, John C. Kleiber
BY
James E. Toomey
ATTORNEY United States Patent Office 3,070,970

Patented Jan. 1, 1963

3,070,970

APPARATUS AND METHOD FOR COOLING FINELY DIVIDED SOLID PARTICLES

Peter G. Zagar, Palo Alto, Robert H. Burns, San Jose, Dante Falcioni, Cupertino, and John C. Kleiber, Los Gatos, Calif., assignors to Permanente Cement Company, Oakland, Calif., a corporation of California Filed Aug. 7, 1959, Ser. No. 832,264
19 Claims. (Cl. 62—63)

This invention relates to an apparatus and a method for cooling finely divided solids, particularly in fluidized condition; and in a particular manner it relates to the cooling of fluidized finely divided cement particles.

The cooling of finely divided solid particles is extremely difficult. This problem has been encountered for many years in the Portland cement industry, especially, wherein the cooling of these finely divided cement particles has posed a considerable problem. The cooling of such particles has required large apparatus and a long time because of the fine subdivision of the material which apparently provides an insulating layer of gas or air on the surface of the particles, reducing enormously the transfer of heat therefrom to the cooling medium. For example, if a silo is filled with finely divided cement at 200 degrees F., it will be found some weeks later that the temperature of the cement within the silo will probably have decreased by less than 5 degrees. Many attempts have been made in the past to provide more efficient cooling means for this material and a great variety of equipment has been designed for this end. However, an efficient means of cooling has not hitherto been devised.

It is an object of this invention to provide an apparatus which effects efficient cooling of finely divided solid materials in fluidized state, especially of fluidized finely divided cement.

It is a further object of this invention to provide a cooling cell device which effects efficient cooling of fluidized finely divided solid particles such as pulverized Portland cement.

It is a still further object of this invention to provide a method for efficiently cooling fluidized finely divided solids.

It is a specific object of the invention to provide a method for rapidly and efficiently cooling fluidized Portland cement particles.

It is a still further object to provide an apparatus for cleaning and cooling fluidized Portland cement particles, in an efficient and rapid manner.

Other objects and advantages of the invention will be obvious from the description below. The accompanying drawings show some embodiments of an apparatus according to the invention and of the method employed in carrying out the process of the invention.

According to the present invention there are provided a method and an apparatus for the cooling of finely divided solid particles, such as powdered Portland cement, in a more effective and rapid manner than can be done by the methods and devices known to the art. In the method of the invention, the finely divided solid particles are fluidized by aeration, or admixture with a gas such as air, in any desired manner to form a flowing stream of particles in fluidized state in a gas, the fluidized stream is introduced into a feed zone and aerated to clean and to effect uniform flow, and then into a cooling zone and is brought into contact with a cooled, flat surface, preferably a plurality of such surfaces, such surface being cooled by flowing a cooling medium thereover on the side opposite from the side in contact with the fluidized solid stream, and out of contact with such stream, preferably flowing the cooling fluid in a thin sheet whereby the cooling liquid is at least partially vaporized, and the vaporized liquid is removed from the cooling zone. The flat surface provides large areas of heat exchange zone between the fluidized solid particles and the thin stream of liquid. The fluidized stream of particles is preferably flowed over the cooling surface in a circuitous path to effect the greatest amount of cooling. The cooled material is removed from the cooling zone and the solids particles separated from the fluidized stream to recover the desired solids material. The fluidized solid stream and the stream of cooling fluid are, in other words, in indirect heat exchange contact, and in a particularly efficient manner the heat of the fluidized solids effects increase in the vapor tension and the vaporization of the cooling liquid, the vaporized cooling medium being continuously removed in a preferred operation in order to prevent any build-up of vapor pressure within the cooling cell.

Some preferred embodiments of the apparatus according to the invention are shown in the accompanying drawings.

Figure 1:
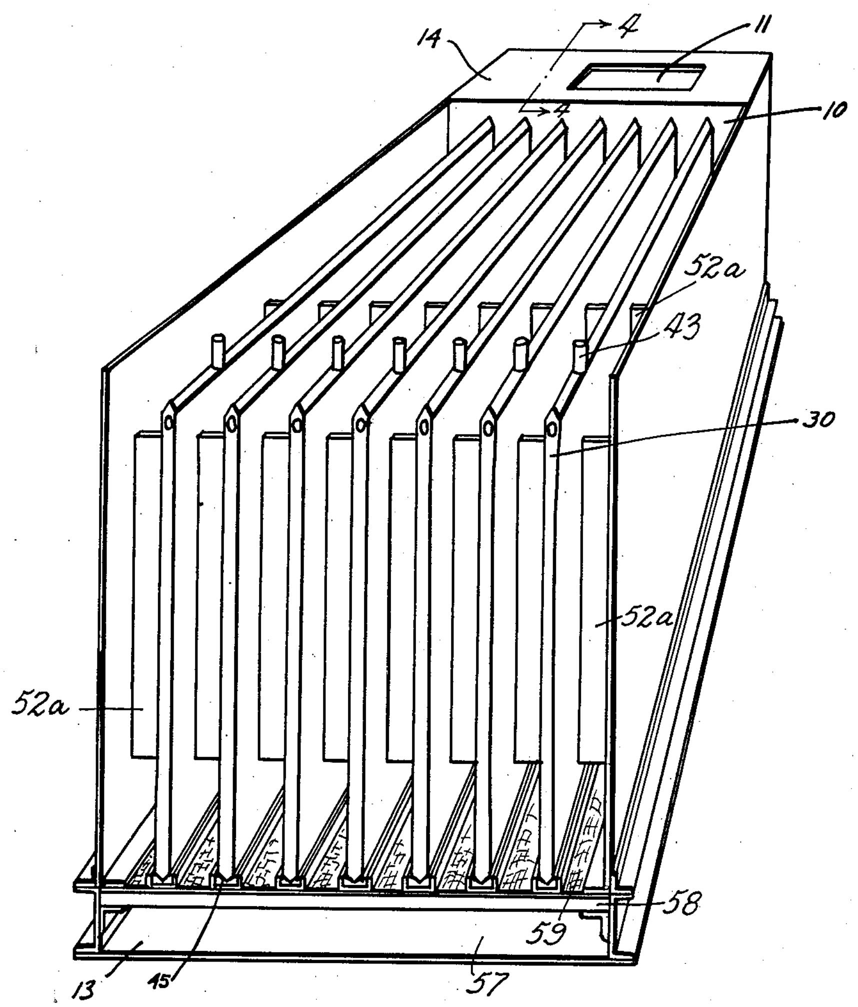
FIGURE 1 is a perspective view of a cooling chamber according to the invention showing the arrangement of cooling cells, in a preferred embodiment, with the discharge end cut away.
Figure 7:
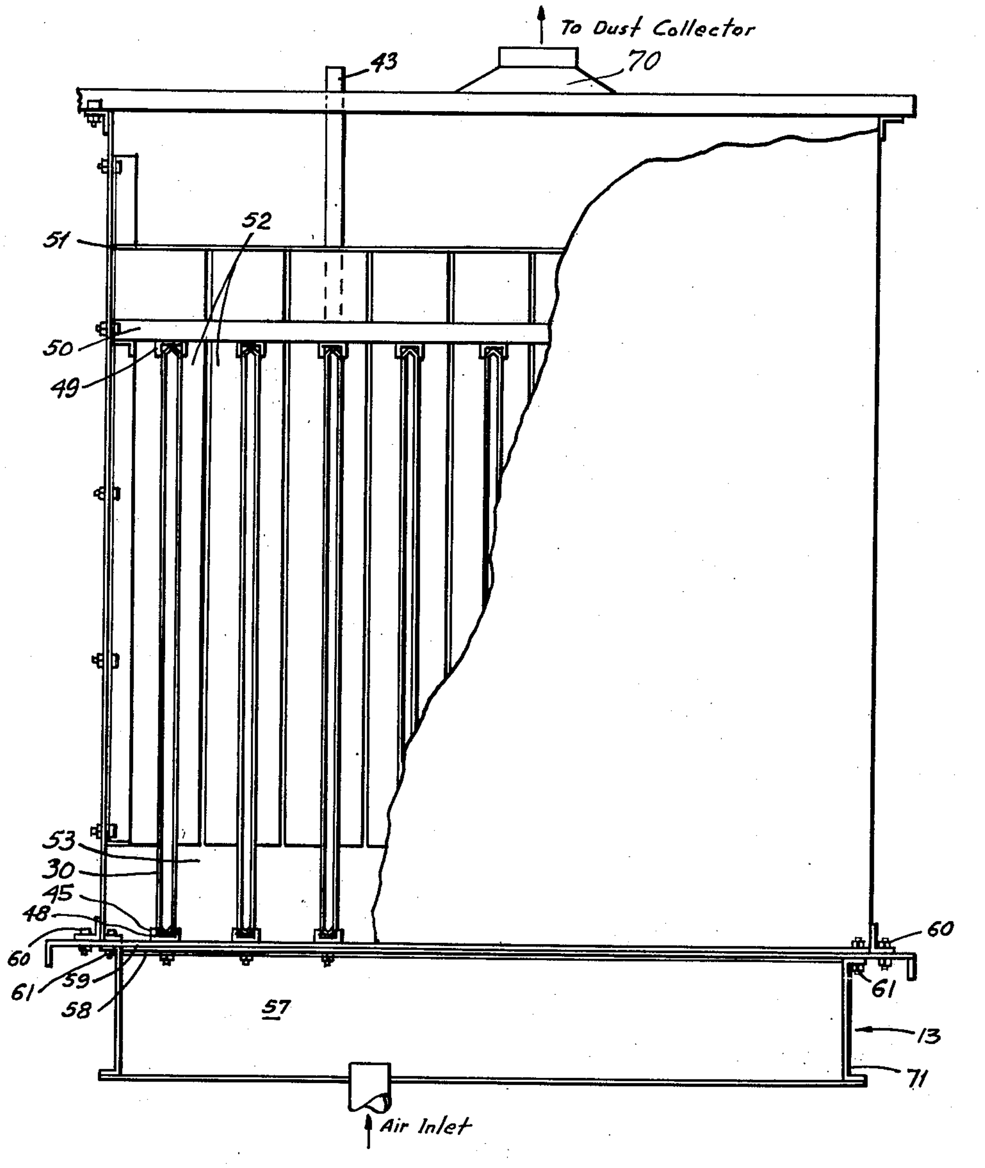
FIGURE 7 is an end view of the cooling chamber, partially in section, showing one bottom assembly and a cell and baffle arrangement.
Figure 8:
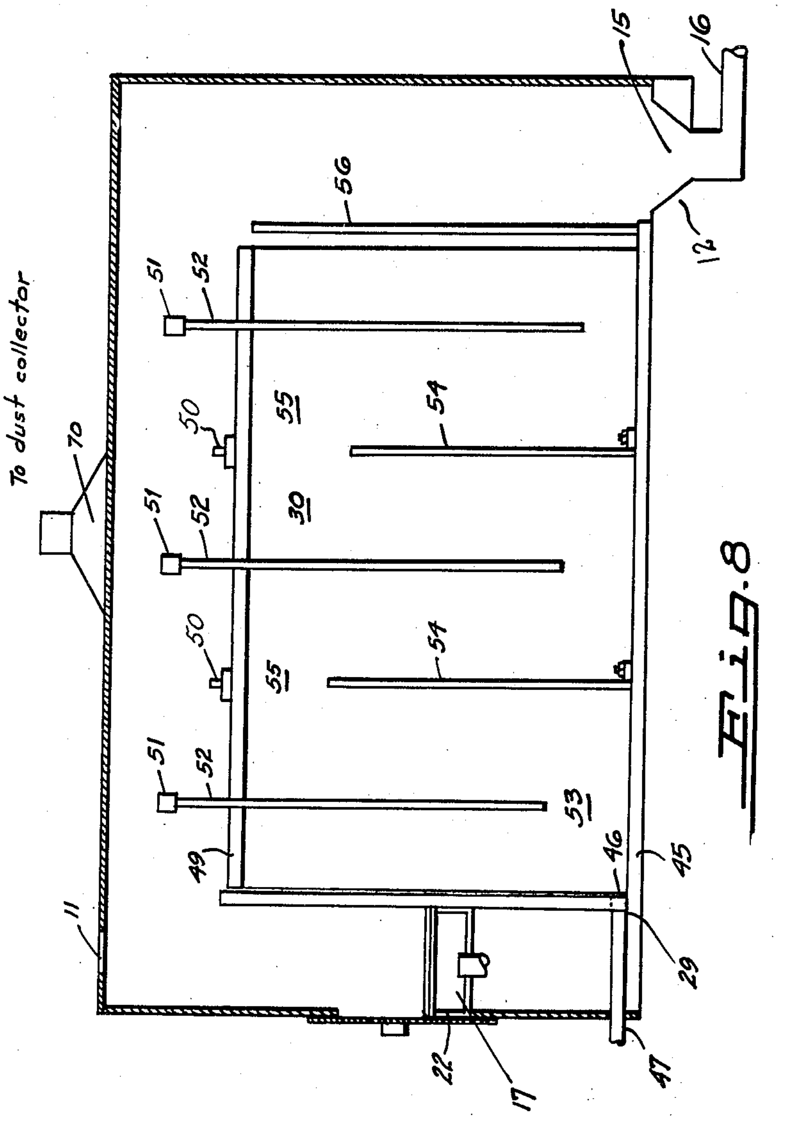
FIGURE 8 is a somewhat schematic sectional view longitudinally of the cooling chamber between a pair of cooling cells, and showing particularly a baffle arrangement.

In FIGURE 1 there is shown a perspective view of a cooling device according to the present invention, and particularly certain elements thereof. A cooling chamber 10, which in this embodiment is generally rectangular and is disposed generally horizontally has disposed within it a number of flattened cooling cells 30. Cooling cells 30 are disposed longitudinally of chamber 10 or, in other words, in the direction of flow of the fluidized solids stream. Baffles 52*a* are disposed between cooling cells 10, only a portion of the total number of baffles being shown, and other baffles not appearing in this view. A more complete baffle arrangement is shown in FIGURE 8. Chamber 10 is also preferably provided with removable bottom aerating means as indicated generally at 71 and described more fully with respect to FIGURE 7. Other elements are shown in other figures.

The finely divided solids, which for purposes of illustration will be Portland cement clinker ground to pass through a 200 mesh screen, are fluidized in any desired manner, methods for such fluidization being well known to the art and not necessary to describe herein. Preferably, the gas employed for such fluidization is air because air is cheap, plentiful and convenient to use. The fluidized cement particles are introduced in a continuous stream through a conduit, e.g. as shown at 72 (FIG. 4), debouching into the cooling zone and chamber at aperture 11, which in this embodiment is disposed in end portion 14 of the top of the chamber.

Figure 6:
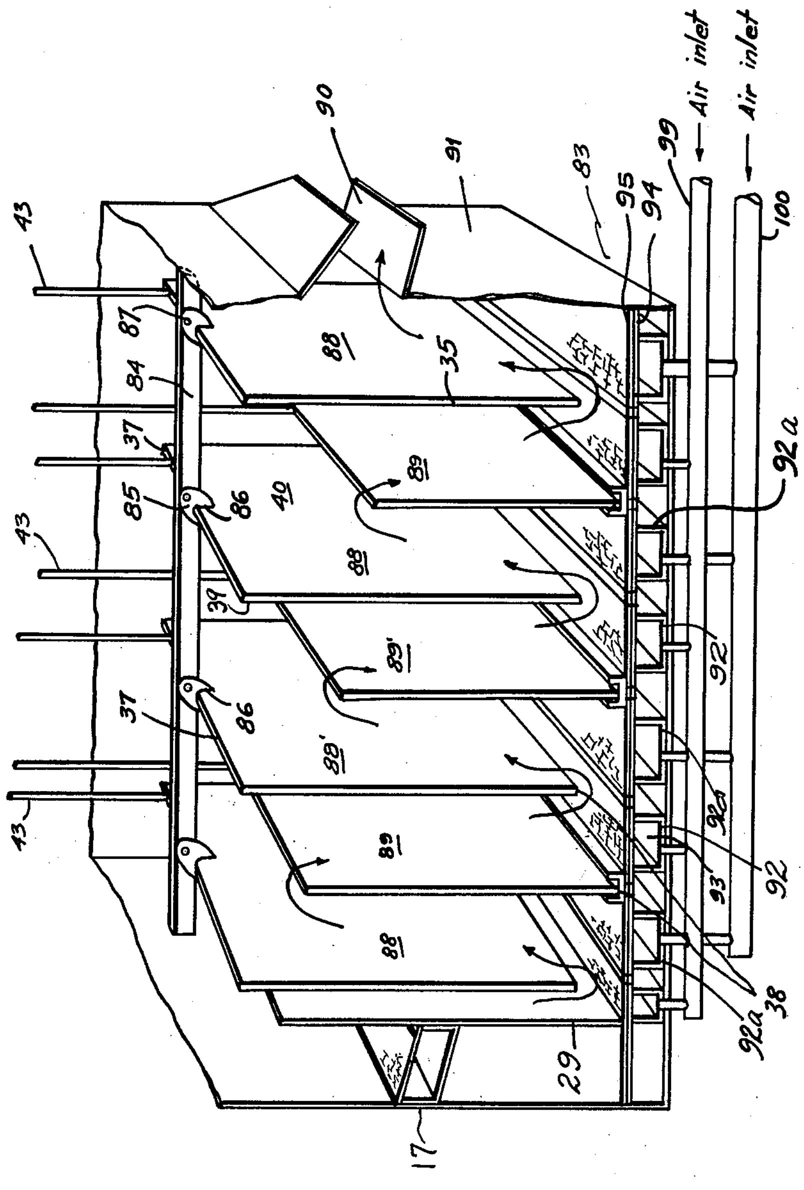
FIGURE 6 is a perspective view of an alternative arrangement of the cells in the cooling chamber, and showing also an alternative cell structure.

The fluidized solids stream flows through chamber 10 toward discharge outlet 12 (Cut away in FIG. 1, but corresponding to the outlet 12 in FIG. 8), which is disposed at a level below that of the inlet aperture and in a preferred embodiment shown in FIGURE 8, is a hopper 15 disposed at the bottom of chamber 10 at the discharge end thereof, and this hopper conducts the cooled stream of fluidized solids to outlet conduit 16. Another arrangement is shown in FIGURE 6.

Figure 4:
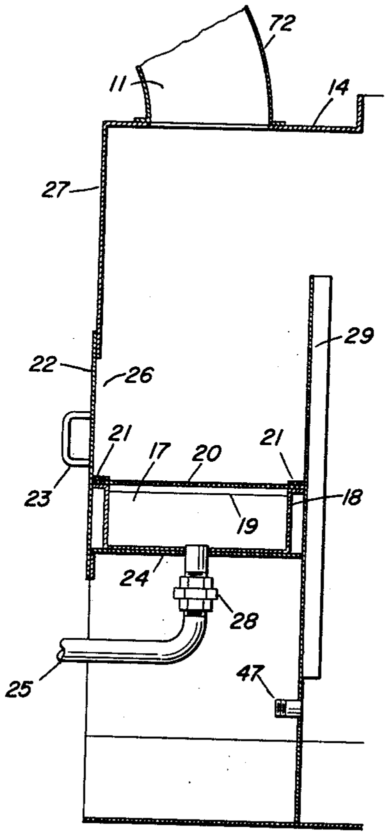
FIGURE 4 is a sectional view on the line 4—4 of FIGURE 1, showing a feed or inlet zone arrangement.
Figure 5:
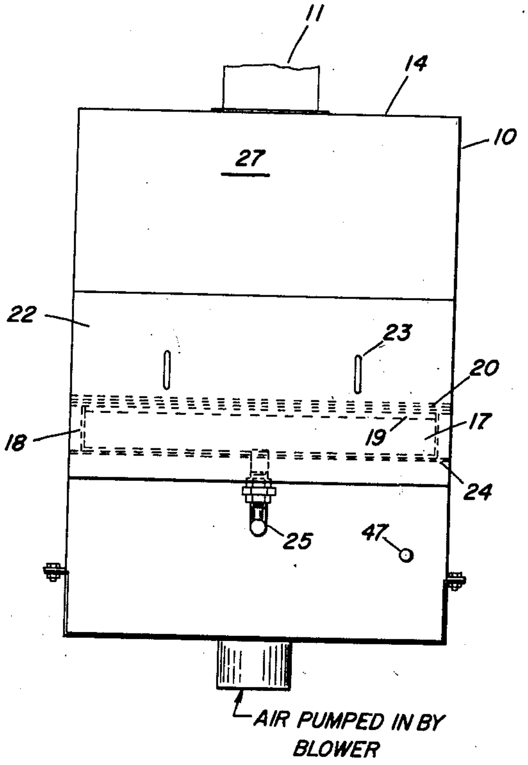
FIGURE 5 is an end view of the cooling chamber of FIGURE 1, at the feed end.

The fluidized solids stream is introduced at 11 and preferably falls toward an aerator device 17, one embodiment of which is shown in more detail in FIGURES 4 and 5. In this embodiment the aerator device 17 comprises a metal tray 18 which is closed on all sides except the top and which extends substantially the entire width of the cooling chamber. Tray 18 is elongated and relatively narrow and shallow, and disposed at the top thereof is placed a wire grating or screen 19, and over the wire is placed cloth filter 20, held by clamps 21, 21 to the grating and tray. A pipe 25 serves to introduce air from a pump or blower (not shown) into tray 18 below the grating 19. Tray 18 rests on platform 24 which is attached to panel 22 and the whole assembly can be pulled out through aperture 26 in end wall 27 of the cooling chamber 10, by handles 23, for cleaning at desired intervals, pipe 25 being disconnectable at coupling 28. In an alternative arrangement, the pad or filter 20 only is removable for cleaning, the tray being fixedly disposed in the cooling chamber.

Disposed in chamber 10 just beyond aerator 17 and extending vertically upward from the bottom of chamber 10 is end baffle 29, over the top of which the fluidized material flows to the cooling cells. The baffle 29 terminates below the top of chamber 10 to permit flow of the fluidized material.

Figures 2, 3:
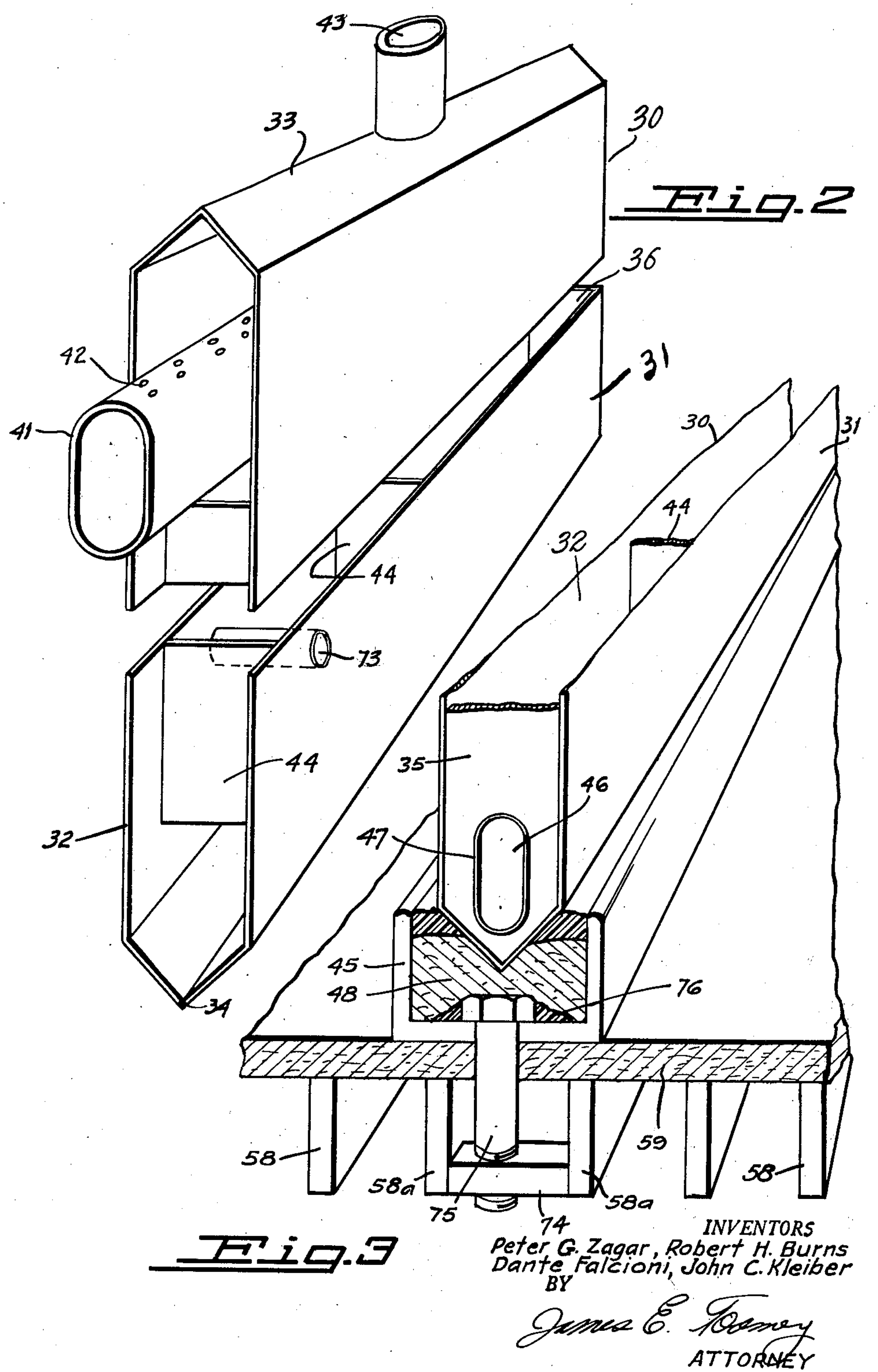
FIGURE 2 is a perspective view of one cooling cell according to the invention, with an end plate omitted.
FIGURE 3 is a partial perspective view of a cooling cell, according to the invention, showing its arrangement with respect to the base of the cooler.

A plurality of cooling cells 30 are disposed in chamber 10, any desired number being employed. Details of some embodiments of the cells are further shown in FIGURES 2 and 3. In an installation for cooling fluidized Portland cement in a chamber about 16 feet long, 4 feet wide and 5 to 6 feet high, from six to nine cells have been found very suitable. The cooling cells 30 are flat, hollow metal shells of much greater length and width than thickness. In one suitable embodiment such a cell is 2½ feet high, 10 feet long and 1⅛ inches thick with an interior space ⅞ inch across, or, in other words, each cell wall is a plate ⅛ inch in thickness. Preferably, between the metal sheets forming the lateral walls are disposed internal cross ribs 44 of metal to reinforce the cells and to prevent collapse under the pressure of the fluidized medium, and tie-pieces 73 to prevent bowing-out if internal vapor pressure should increase substantially. Tie-pieces or rods 73 are affixed, for example, by cutting a hole in each of walls 31 and 32, these holes being opposite each other, then inserting rods 73 to span the thickness of the cell, and welding each end of rod 73 flush with the surface of the respective wall. A suitable flat cell 30 is shown in FIGURES 2 and 3, wherein two steel sheets 31 and 32 are bent at angles adjacent their top and bottom edges to form closures in the forms of V's and inverted V's, at 33 and 34, and the sheets are welded together at the meeting line of the closures. The end walls are closed by flat metal strips 35, 36 welded to the end edges of the sheets 31, 32. Alternatively, in any installation according to the invention, the top closures of the cooling cells can be flat metal strips 37, 38, welded to top and bottom edges respectively of side walls 39, 40, as illustrated in FIGURE 6. However, the V or inverted V closing is preferred because only one weld is required in fabrication; and, furthermore, the water spray is more evenly spread into a thin sheet flowing down the interior walls of the cell as will be further described herein.

Disposed adjacent the top of cooling cells 30, 88 etc., are pipes 41 having a number of holes or apertures 42 along their upper surfaces through which a cooling liquid, such as cool water, is sprayed against the inner top surface of the cells. The water then runs down over the interior surfaces of walls 31, 32, 39 and 40, in a thin sheet effecting cooling of the walls not only by reason of the lower temperature of the water but because the large surface of the water sheet enables vaporization of the water with more efficient cooling by utilization of the latent heat of vaporization. A pipe 43 at the top of each cell vents the interior to the atmosphere outside of the cooling chamber, enabling escape of vapors and preventing build-up of pressure within the cell, thus insuring uniform and maximum cooling effects. (Such vent pipe is shown as an example in FIGURE 7.) In FIGURE 2 there are shown two crosspieces or braces 44, as illustrative of the bracing of such cell, but it will be understood that several such braces or ribs can be disposed along the length of the cell, successive ribs being welded alternately to the interior face of one and the other lateral wall, for example, the first, third and fifth ribs being welded or otherwise affixed to wall 31, and the second, fourth and sixth ribs being welded or affixed to wall 32. Likewise, several tiepieces, such as 73, are useful in each cell, depending upon the size of the cell. At the bottom of each cell is an aperture 46 and pipe 47 to withdraw outgoing cooling liquid.

Suitably, each cooling cell rests in a support such as a channel iron 45 which is fixedly disposed upon the bottom of the cooling chamber in FIGURE 1, suitably by bolting as more clearly shown in FIGURE 3. As shown in FIGURE 3, a metal cross-piece 74 is welded to adjacent parallel bars 58*a* of grating 58, and crosspiece 74 is tapped to receive bolt 75 which affixes channel 45 to grating 58. Preferably, there is also provided a layer of felt 48 and sealing compound 76 in channel iron 45, to cushion the cell, especially where the V closure is employed. Likewise, as shown in FIGURES 6, 7, 9 or 10, the top of each cell fits within a bifurcated or forked lug 81 or channel iron 49 or forked plate 85, for instance which is detachably affixed to crosspiece 50, e.g. by bolts 77, or 87 to maintain the cell in position. Any other desired means for maintaining each cell in position can be employed.

In order to flow the fluidized stream in a more circuitous path over the cooling surfaces, in one embodiment a series of baffles is disposed between each pair of cells and at right angles to their lateral faces. One of such series of baffles is shown in FIGURES 7 and 8. A baffle support 51 is supported by the side walls of chamber 10 in any desired manner and from this support 51 there depend any desired number of baffle plates 52 which extend partially to the bottoms of cells 30, but leave a passageway, as at 53, through which the fluidized stream flows on its way. The next succeeding baffle 54 in a series between a pair of cells rests on the bottom 13 of chamber 10 and extends upwardly only part way to the top of cells 30, leaving another passageway 55 for flow of the fluidized stream, and preferably the baffles are in descending arrangement, i.e. are of decreasing height and conversely increasing depth in the direction of flow, to assist in maintaining rate of flow. In other words, the ends of the baffles decrease in vertical distance above the base of the chamber, in the direction of flow, as shown in FIGURE 8.

Figures 9, 10:
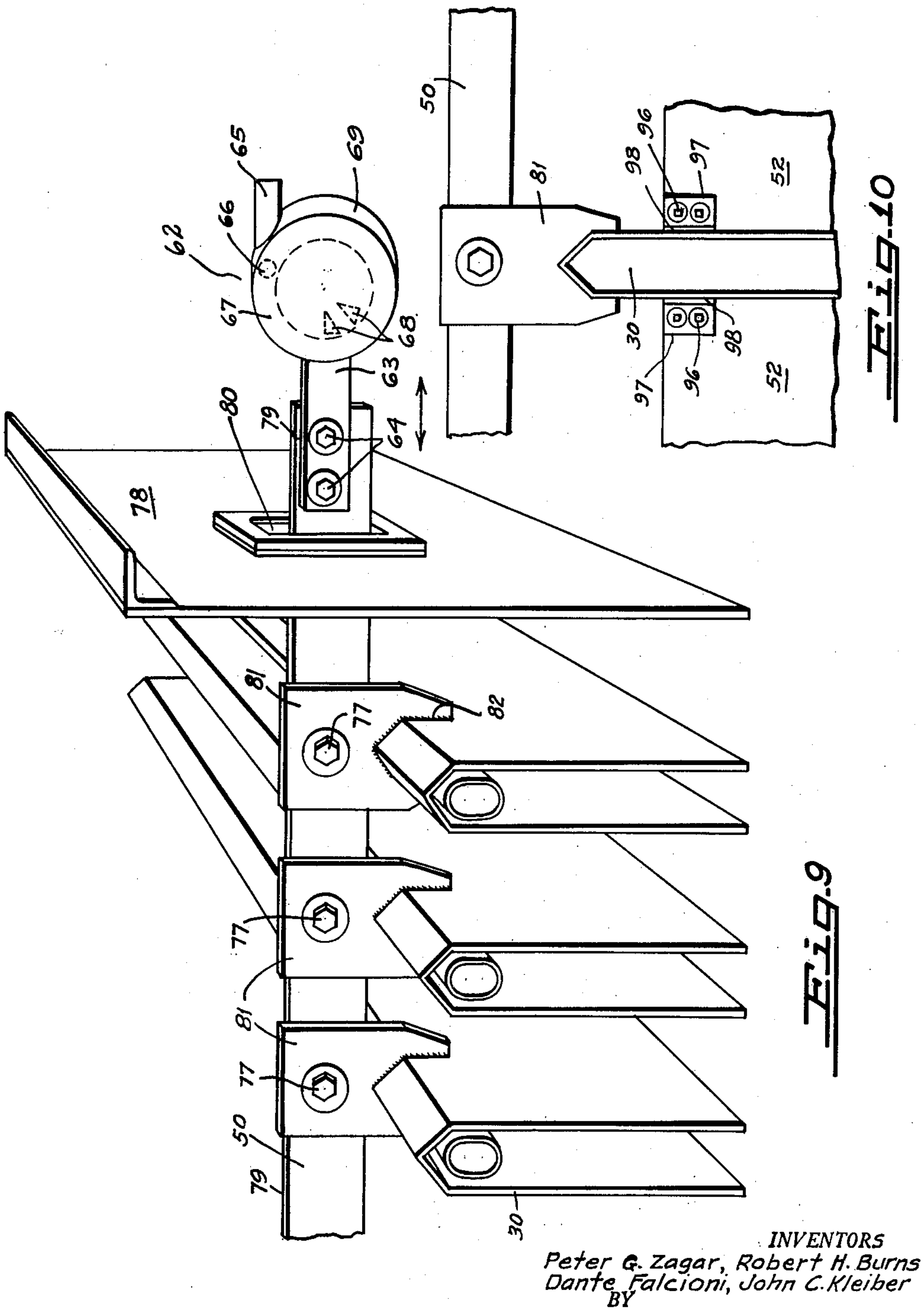
FIGURE 9 shows an arrangement for jarring or vibrating the cooling cells, and a means for maintaining cells in upright position.
FIGURE 10 shows an alternative baffle arrangement in a device such as shown in FIGURE 1.

At the discharge end of the chamber and adjacent the ends of cells 30 is preferably disposed end or outlet gate 56, which is vertically adjustable by any desired means, not shown, whereby rate of flow of the fluidized solids can be regulated. In an alternative arrangement, the cooling cells are suspended by means of a cross-bar and bifurcated plates, as illustrated in FIGURE 9, and depending baffles such as 52 are detachably affixed by means of bolts 96 to angle irons 97 welded at 98 to the side walls of the respective cells. Such an arrangement is indicated in FIGURE 10, showing only the manner of attaching the baffle to the cell wall.

The bottom 13 of chamber 10 is provided with an air chamber 57 at the top of which is provided grating 58, and a porous membrane such as a fabric or cloth 59 is disposed over the grating, to form an aerating device at the bottom of the chamber to maintain the suspension of solids in fluidized state and to maintain continuous flow of the fluidized stream. It is preferred to clean the air intended for the bottom aerator by passing it through a filter or screen (not shown) before introducing it through the aerating grating 58 and fabric pad 59. As will be shown below, cooling efficiency is greatly increased by such filtration. Excess air is drawn off at aperture 70 in the top of the cooling chamber and sent to a dust collector. As shown in FIGURE 7, the bottom aerator assembly is detachably or removably affixed to the bases of the side and end walls of the cooler chamber 10 and can be removed for cleaning or repair operations. Likewise, the cover of chamber 10 is preferably removable in sections to enable installng and repairing operations, especially of the cooling cells. In the embodiment of FIGURE 7, bottom assembly 13 is removable by unbolting at bolts 60 and 61.

FIGURE 6 illustrates another device or apparatus, according to the present invention, and a further means for causing circuitous flow over the cooling cells or cooling surfaces. In FIGURE 6, the cooling cells 88, 89 are each made up of two lateral walls 39 and 40, flat top plate 37 and flat bottom plate 38, and flat end walls such as shown at 35. In this arrangement the cells are arranged in chamber 83 generally perpendicularly or transverse to the flow of the stream of fluidized solids, the stream flow being shown by the arrows. In this manner, the cooling cells act also as baffles and provide a circuitous flow of the fluidized solids, because alternate cells provide free space at the top and bottom thereof, respectively, for stream flow. In this arrangement, supporting bar 84, of which more than one is provided if necessary, extends across chamber 83 from end wall to end wall. Bifurcated plates 85 are welded at 86 to the tops of cells 88 and are detachably affixed to bar 84 by bolts 87, to suspend cells 88. These will be referred to as downwardly extending cells to distinguish from upwardly extending cells described below. The upwardly extending cells 89 in the chamber 83 are disposed alternately with the downwardly extending cells whereby upper and lower passages are alternately provided for flow of the fluidized stream. The downwardly extending cells are supported from an upper support means, such as a metal bar, beam or the like, disposed at the upper part of the chamber; and terminate at their lower ends above the base of the chamber. The upwardly extending cells are supported on or adjacent the base of the chamber and terminate at their upper ends below the upper ends of the downwardly extending cells. The upwardly extending cells 89 suitably rest in channel irons bolted to the base of the chamber and provided with felt and sealing compound as described in connection with FIGURE 3. These upwardly extending cells are of successively decreasing height in the direction of flow to assist forward flow of the fluidized stream. The discharge outlet 90 in end wall 91 of chamber 83 is at a level below that of the feed inlet. The cooled, fluidized stream is withdrawn from outlet 90 by means of an airslide, or in any other desired manner (not shown). The cells are of the same construction as cells 30, including vents, spray pipes and outlets, excepting only that the top and bottom closures are flat plates.

At the base of chamber 83 there are disposed a plurality of aerators 92, 92*a*, arranged transversely to the direction of flow of the fluidized stream. One such aerator is disposed beneath the space between each pair of cells, 88—89 and 89—88. Each aerator 92, 92*a* is of like construction to that of aerator 17, described above, being composed of a shallow pan or trough 93, having a grating 94 disposed at the top thereof and a fabric pad 95 disposed at the top of the grating. Air is supplied to each aerator by suitable, conventional means, not shown. Preferably, air at slightly higher pressure is introduced into each aerator which underlies the space downstream of a downwardly extending cell. As a specific example, such higher pressure air is introduced into aerator 92*a* which underlies the space between cells 88′ and 89′ in FIG. 6, and so on. This causes the stream or bed above such aerator to become lighter than the stream or bed above aerator 92, e.g., and the heavier bed displaces the lighter bed, inducing or maintaining flow.

The feed inlet arrangement in the device of FIGURE 6 is like that of FIGURE 1 and comprises an inlet zone, an inlet aperture adjacent to or in the top of the chamber over the inlet zone, an elongated aerator disposed beneath the inlet aperture; and a weir or baffle (as indicated at 29 in FIG. 6) adjacent the aerator, separating the inlet zone from the cooling zone and providing for flow of the stream of fluidized solids over the top of such weir and into contact with the first flat cooling cell. The cells are spaced below the top of the chamber to provide for removal of excess air to a dust collector or to provide for flow of the fluidized stream in the event that plugging or flow stoppage occurs in the cooling zone proper, and an outlet to a dust collector device is provided, all similarly to the top arrangement shown in FIGURE 7.

In the arrangement and apparatus of FIGURE 6, a stream of fluidized solids such as fluidized Portland cement is fed into the inlet zone and is aerated by the elongated aerator disposed in such zone to provide uniform flow over the weir and to remove tramp iron and oversize particles, as in the operation of the device in FIGURE 1. The stream flowing over the weir comes into contact with the first cooling cell 88 and is deflected downwardly, thence proceeding upwardly between cells 88 and 89, over the top of cell 89 and downwardly and so on as shown by the arrows, finally discharging through outlet 90. As indicated above, air under slightly higher pressure is employed in alternate bottom aerators shown at 92*a*, which underlie the space between cells 88 and 89 or are, in other words, immediately downstream of cells 88. In a convenient arrangement, one air manifold 99 would feed a first flow of air into aerators 92; and a second air manifold 100 would feed a second flow of air into aerators 92*a*. Suitable air pressures in aerators, such as 92*a*, are about 1 to 4, or preferably about 2 lbs. per sq. in. higher than the air pressure in aerator such as 92, for example.

It is an advantage of the present invention that the cooling device provided is simple and inexpensive to construct and to maintain. It is a still further advantage that there is obtined by this device constant and uniform flow of the fluidized solids stream and maximum contact between the particles to be cooled and the cooling surface. It is a further advantage also that the device enables maximum utilization of the cooling effect in that, even at moderate temperatures, the latent heat of vaporization of the cooling liquid is utilized.

In a typical mode of operation of the method of this invention, Portland cement solids ground to minus 200 mesh and coming from a finishing mill are fluidized in air in the known way, the solids having an average specific surface of 3200 square centimeters per gram (Blain method), to provide a stream of fluidized solids which is introduced into cooler chamber 10 at 11, as shown in FIG. 1, at a temperature of 208 degrees F. The stream falls onto aerator 17, air being introduced through pipe 25 at low pressure of up to about 6 lbs. per sq. in. pressure, feeding in about 8 to 10 cu. ft. of air per square foot of fabric pad area. The stream is thereby freed of tramp iron and oversize materials which remain on fabric 20 and are cleaned off at intervals as described above. More importantly, the stream is found to be diffused uniformly to flow at a uniform rate over end baffle or weir 29 and along the surfaces of cooling cells 30 of which six are provided in this example of operation. The solids are fed at a rate of 150 barrels per hour, based on non-fluidized state, and exit from the apparatus through pipe 16 at a temperature of 157 degrees F. Water is fed through the cooling cells 30 at a total rate for six cells of 28 gallons per minute. Air is fed into bottom 13 at a pressure of 2 to 6 lbs. per sq. in. In the apparatus of this example, the overall length of the cooling chamber is about 15.5 feet, the width thereof is 4 feet, and the height about 6 feet. The cooling cells 30 are each about 12 feet long, 4 feet high, and 1⅛ inches thick, having ⅞ inch interval space between side walls.

In another run in the same apparatus, air is fed into aerator 17 and bottom 13 at a pressure of 6.5 lbs. per sq. in. Fluidized Portland cement is introduced at 11 at a temperature of 235 degrees F. and at a rate of 135 barrels solids per minute, and is discharged at 16 at a temperature of 180 degrees F. Water is introduced into the cooling cells 30 at a temperature of 54 degrees F. and is discharged at a temperature of 70 degrees F., being fed at a rate of 28 gals. per minute.

It has been found over a series of runs according to the invention that where air is fed to the bottom aerator without removal of entrained solids from such air, the cement stream is reduced in temperature on an average of about 30 degrees F.; whereas under conditions which are otherwise exactly the same except that the entrained solids are removed from such air, e.g. by filtration, to provide cleaned, filtered or dust-free air, the reduction in temperature can be increased up to about 90 degrees F., or as much as three times the effectiveness of cooling where uncleaned bottom aerating air is employed.

As is also shown in the drawings, the cooling cells and baffles are disposed in the cooling chamber spaced from the top of the latter, whereby a free space is left at the top of the chamber. This enables withdrawal of excess air to any desired dust collection system and also enables flow of the fluidized stream in the event that any plugging or other interference with flow occurs at any point along the cooling path.

In a still further arrangement, it has been found highly advantageous to tap or jar the cooling cells during the cooling cycle. This has been observed to increase the cooling efficiency substantially. It may be that such vibrating, tapping, shaking or jarring dislodges an insulating layer of air and brings the finely divided fluidized solids into direct contact with the cooling surface; or it may be that at the interior surface of the cooling cell, such tapping or jarring dislodges or breaks up a layer of air or vapor between the metal surface and the coolant; or both such effects may be obtained. Whatever the reason, or mechanism of the action, it has been observed that continuous tapping or jarring effects an additional temperature reduction of from 20 degrees to 50 degrees F. That is, if the temperature of a stream of fluidized Portland cement particles is reduced in a cooling chamber such as described in the example above from 208 degrees F. to 185 degrees F., the temperature is reduced from 208 degrees F. to 157 degrees F. when the cells are continuously jarred or tapped, preventing adherence of a layer of the fine cement solids on the cooler cell surface, or formation of a vapor-film etc.

One suitable arrangement for effecting such vibrating, jarring or tapping is shown in FIGURE 9. In this figure, there are shown only the essential elements for effecting vibration, and various supporting elements are omitted for greater clarity. Cooling cells 30 are disposed within the cooling chamber of which only part of one wall 78 is shown. In this embodiment, the cells are held at the top by a cell keeper comprised of cross-bar 79 which extends across the chamber above the tops of cells 30 and passes out through wall 78 through a suitable packing gland 80. At the top of each cell is forked or bifurcated plate 81 which is welded to the cell as at 82 and which is detachably affixed to bar 79 by bolt 77. Exteriorly of wall 78 is vibrator 62 which in this illustrative example is composed of an inlet 65 for compressed air, steel ball 66 disposed within and freely movable in ball race 67 within the shell 69, and outlets 68 for exhaust air at the central portion of the shell or casing. The vibrator is provided also with arm 63 which is bolted to crossbar 79 at 64. Compressed air is introduced at 65, which air forces the ball 66 to travel at high speed around the race 67, causing effective vibration of the cells 30 by way of arm 63 and crossbar 50. The arrows show the direction of motion.

The size of the particles to be cooled is not critical, and any size suitable for fluidizing is useful. The oversize material referred to is a carry-over of agglomerates not suitable for fluidizing. Although felt is shown as a cushioning means at the bottom edges of the cells, other resilient elements can alternatively be used, for example, springs, rubber pads, foam rubber elements, etc. The numbers of cooling cells and of bafflles are variable as desired, depending upon the amount of material fed to the device, the degree of cooling desired, etc. Mesh sizes where shown herein are the well-known Tyler mesh sizes.

The above examples and specific description have been given for purposes of illustration only, and variations and modifications may be made therein without departing from the spirit and scope of the appended claims. Each of the figures shows one or more of the features of this invention but no single figure shows every such feature in all combinations.

Having now described the invention, what is claimed is:

1. In an apparatus for cooling fluidized fine solid particles, a chamber having an inlet conduit at the top and an outlet conduit at the bottom at the opposite end of said chamber, an elongated aerator means disposed in said chamber below said inlet conduit, a plurality of spaced-apart cooling cells disposed vertically within said chamber, each of said cells being of much greater length and width than thickness, a series of baffles disposed between each pair of said cells to cause said fluidized particles to travel a circuitous path, a pipe for cooling fluid disposed within each said cell adjacent the top thereof, each said pipe having apertures on the upper surface, an outlet pipe disposed at the bottom of each said cell, and means for venting each said cell to the atmosphere.

2. In an apparatus for cooling fluidized fine solid particles, a chamber having an inlet conduit at the top and an outlet conduit at the bottom at the opposite end of said chamber, an elongated aerator means disposed in said chamber below said inlet conduit, a plurality of vertical, spaced-apart cooling cells disposed longitudinally in the direction of flow of said solids in said chamber, each of said cells being of much greater length and width than thickness, a series of baffies disposed between each pair of said cells to cause said fluidized particles to travel a circuitous path, a pipe for cooling fluid disposed within each said cell adjacent the top thereof, each said pipe having apertures on the upper surface, an outlet means disposed at the bottom of each said cell, means for venting each said cell to the atmosphere, and a removable aerator means disposed over substantially the entire bottom of said chamber.

3. In an apparatus for cooling fluidized fine solid particles, a chamber generally horizontally disposed and having an inlet conduit at one end at the top and an outlet conduit at the bottom at the opposite end, an elongated aerator means disposed in said chamber below said inlet conduit for effecting uniform flow and separating tramp iron and oversize particles, a plurality of spaced-apart cooling cells disposed vertically within said chamber and longitudinally in the direction of flow of said fluidized solids, each of said cells being of much greater length and width than thickness, and having a top closure in the form of an inverted V, a series of baffles disposed between each pair of said cells to cause said fluidized particles to travel a circuitous path, a pipe for cooling fluids disposed within each said cell or adjacent the top thereof, each said pipe having apertures on the upper surface, an outlet pipe disposed at the bottom of each said cell, and means for venting each said cell to the atmosphere.

4. In an apparatus for cooling fluidized fine solid particles, a chamber generally horizontally disposed and having an inlet conduit at the top at one end and an outlet conduit at the bottom at the opposite end of said chamber, a transverse, elongated aerator means adjacent the inlet end for providing uniform flow and separating tramp iron and oversize particles, a plurality of spaced-apart cooling cells disposed vertically within said chamber, each of said cells being of much greater length and width than thickness and having an inverted V top closure, and a removable aerator comprising a web of fabric covering the base of said chamber and means disposed below said web for introducing air to diffuse through said web and maintain aeration of said solids, a pipe for cooling fluid disposed within each said cell adjacent the top thereof, each said pipe having apertures on the upper surface, an outlet means disposed at the bottom of each said cell, means for venting each cell to the atmosphere, and a series of baffles between each pair of said cells to cause circuitous flow of said fluidized particles.

5. In an apparatus for cooling fluidized fine solid particles, a rectangular chamber generally horizontally disposed and having inlet conduit at the top at one end thereof and an outlet conduit disposed at the opposite end of said chamber and below said inlet conduit, a metal tray disposed below said inlet conduit at the inlet end of said chamber and a web of fabric disposed over the top of said tray, and an inlet conduit into said tray for introduction of gas, a plurality of spaced-apart cooling cells disposed vertically within said chamber, each of said cells being of much greater length and width than thickness and having an inverted V-shaped upper closure, a pipe for cooling fluid disposed within each said cell adjacent the top thereof, each said pipe having apertures on the upper surface, an outlet pipe disposed at the bottom of each said cell, and means for venting each said cell to the atmosphere, a series of baffles disposed between said cells to effect circuitous flow of said fluidized particles, a removable aerator means over the bottom of said chamber, and a weir abutting the inlet end of said cells adjacent said tray.

6. An apparatus for cooling fluidized fine solid particles comprising a chamber generally horizontally disposed and having an inlet conduit adjacent the top at one end and an outlet conduit at the opposite end disposed below the level of said inlet conduit, a shallow metal tray disposed at the inlet end below said inlet conduit, a grating disposed over the top of said metal tray, a web of fabric disposed over said grating, means for introducing air into said tray, a plurality of spaced-apart cooling cells disposed vertically within said chamber, each of said cells being of much greater length and width than thickness, a series of baffles disposed between each pair of said cells to cause said fluidized particles to travel a circuitous path, a pipe for cooling fluid disposed within each said cell adjacent the top thereof, each said pipe having apertures in the upper surface, an outlet pipe disposed at the bottom of each said cell, means for venting each cooling cell to the atmosphere, and a web of fabric disposed over a grating at the bottom of said chamber below said cooling cells and means for introducing gas below said web to diffuse therethrough and maintain fluidization of said solids, and a weir disposed between said shallow metal tray and said plurality of cooling cells.

7. In an apparatus for cooling a stream of fluidized fine solid particles, a chamber having a top and bottom and four side walls and an inlet means adjacent the top at an inlet zone thereof and an outlet means at a wall opposite said inlet zone, said outlet being disposed at a level below that of said inlet means, an elongated aerator means disposed in said inlet zone below said inlet means to clean said stream and effect uniform flow thereof in a cooling zone, a plurality of spaced-apart flattened cooling cells disposed vertically in said chamber in a cooling zone, each of said cells being of much greater length and width than thickness, means for causing circuitous flow over said cooling cells, means for spraying cooling liquid disposed within each said cell adjacent the top thereof, means for venting each said cell to the atmosphere, means for removing cooling liquid from the bottom of each said cell, and a transverse baffle disposed between said elongated aerator and said cells.

8. An apparatus for cooling fluidized Portland cement particles comprising a rectangular chamber having a top and bottom and four side walls, an inlet means adjacent the top of said chamber at one end and an outlet means disposed at the opposite end and below the level of said inlet means, an elongated aerator disposed in said chamber below said inlet means, a plurality of flattened cooling cells disposed vertically in said chamber, generally parallel to the direction of flow of said fluidized particles, said cells terminating at their upper ends below the top of said chamber, a weir disposed between said aerator and said cooling cells, a pipe having apertures in its upper surface and disposed within each of said cells adjacent the top thereof, an outlet means at the bottom of each said cell, means for venting each cell to the atmosphere, and aerating means disposed at the bottom of said chamber for maintaining flow of said fluidized particles.

9. In an apparatus for cooling fluidized fine solid particles, a chamber having an inlet conduit at the top at one end and an outlet conduit at the bottom at the opposite end, an elongated aerator means disposed in said chamber below said inlet conduit, a plurality of spaced-apart cooling cells disposed vertically within said chamber, each of said cells being of much greater length and width than thickness, a series of baffles disposed between each pair of cells to cause said fluidized particles to travel a circuitous path, a pipe for cooling fluid disposed within each said cell adjacent the top thereof, each said pipe having apertures on the upper surface, an outlet pipe disposed at the bottom of each cell, means for venting each said cell to the atmosphere, a removable aerator means disposed over substantially the entire bottom of said chamber, said cells and said baffles being spaced from the top of said chamber and said chamber having an outlet aperture in the top thereof to provide for removal of excess air.

10. In an apparatus for cooling a stream of fluidized Portland cement particles, a rectangular chamber having a top and bottom and four side walls, an inlet means for said stream disposed adjacent the top of an inlet zone in said chamber, an outlet means for said stream disposed at the end of said chamber opposite and below the level of said inlet means, an elongated aerator means disposed in said inlet zone, a transverse weir adjacent said aerator, a plurality of downwardly extending and upwardly extending flattened cooling cells alternately disposed in a cooling zone downstream of said weir to cause circuitous flow of said stream thereover, a pipe disposed in each of said cells having apertures in the upper surface thereof, outlet means at the bottom of each said cell, means for venting each cell to the atmosphere, and an elongated aerator means at the bottom of said chamber underlying the space between each pair of said cells.

11. In an apparatus for cooling a stream of fluidized Portland cement particles, a rectangular chamber having a top and bottom and four side walls, an inlet means for said stream disposed adjacent the top of an inlet zone in said chamber, an outlet means disposed at the end of said chamber opposite and below the level of said inlet means, an elongated aerator means disposed in said inlet zone to clean said stream and enable uniform flow through a cooling zone, a transverse baffle adjacent said aerator, a plurality of downwardly extending and upwardly extending flattened cooling cells alternately disposed in a cooling zone and transverse to flow of said stream, said upwardly extending cells being of successively decreasing heights in the direction of flow of said stream, a pipe disposed within each said cell and having apertures in the upper surface thereof, an outlet means at the bottom of each said cell, means for venting each said cell to the atmosphere, and an elongated aerator means disposed at the bottom of said chamber underlying the space between each pair of said cells.

12. In an apparatus for cooling a stream of fluidized Portland cement particles, a rectangular chamber having a top and bottom and four side walls, an inlet means for said stream disposed adjacent the top of an inlet zone in said chamber, an outlet means disposed at the end of said chamber opposite and below the level of said inlet means, an elongated aerator means disposed in said inlet zone to clean said stream and enable uniform flow through a cooling zone, a transverse baffle adjacent said aerator, a plurality of downwardly extending and upwardly extending flattened cooling cells alternately disposed in a cooling zone and transverse to flow of said stream, said upwardly extending cells being of successively decreasing heights in the direction of flow of said stream, a pipe disposed within each said cell and having apertures in the upper surface thereof, an outlet means at the bottom of each said cell, means for venting each said cell to the atmosphere, and an elongated aerator means disposed at the bottom of said chamber underlying the space between each pair of said cells, means for introducing air into each said bottom aerator immediately upstream of a downwardly extending cell and means for separately introducing air into each said bottom aerator immediately downstream of said cell.

13. In an apparatus for cooling fluidized solid particles, a chamber having an inlet aperture at the top at one end and an outlet aperture at the bottom at the opposite end, an elongated aerating means disposed in said chamber below said inlet aperture, a plurality of spaced-apart cooling cells disposed within said chamber, each of said cells being of much greater length and width than thickness, means for venting each said cell to the atmosphere, a pipe for cooling fluid disposed within each said cell and adjacent the top thereof, each said pipe having apertures in the upper surface, an outlet pipe at the bottom of each said cell, means for vibrating each said cell, an aerating means disposed over substantially the entire bottom of said chamber, and a series of baffles disposed between each pair of cells to effect flow of said fluidized particles in a circuitous path.

14. A method for cooling fluidized fine solid particles comprising introducing said fluidized particles into a feed zone, aerating to cause uniform flow distribution and separating tramp iron and oversize particles from said fluidized stream, flowing said stream in a circuitous path adjacent a plurality of cooled large surfaces, continuously introducing gas to maintain said stream in fluidized condition, cooling said surfaces by flowing a thin stream of cooling liquid thereover and vaporizing a portion of said liquid, continuously removing said vaporized liquid, and removing said cooled fluidized stream from said cooling cell.

15. Process for cooling fluidized solid Portland cement particles which comprises introducing a stream of said fluidized cement into a feed zone, aerating to cause uniform distribution of flow and separating tramp iron and oversize particles, then passing said fluidized cement in a circuitous path in contact with cooled large surfaces, additionally aerating with clean, filtered air to maintain said particles in fluidized condition, cooling said surfaces by flowing a thin sheet of water thereover out of contact with said fluidized particles, vaporizing a portion of said cooling water, continuously removing vaporized water, and removing said cooled fluidized particles from said cooling zone.

16. Process for cooling fluidized Portland cement particles which comprises introducing a stream of said fluidized particles into a cooling zone, aerating in an elongated narrow zone to cause uniform distribution of flow and to remove tramp iron and oversize particles, then passing said fluidized particles in a circuitous path in contact with cooled surfaces, additionally aerating during such passage to maintain said particles in fluidized condition, cooling said surfaces by flowing water thereover out of contact with said fluidized particles, vaporizing a portion of said water, continuously removing said vaporized water, vibrating said cooled surfaces, and removing said cooled fluidized particles from said cooling zone.

17. Process for cooling fluidized cement particles which includes introducing a stream of said particles into a feed zone, aerating to effect uniform flow and separating tramp iron and oversize particles, then flowing said stream in a circuitous path in a cooling zone in alternately upward and downward flow in contact with cooled large surfaces, continuously aerating said stream with addition of a first flow of air under low pressure to said stream in downward flow and with a second flow of air under higher pressure to said stream in upward flow, and removing said cooled stream from said cooling zone.

18. Process as in claim 17 wherein said second flow of air is under a pressure about 1 to 4 lbs. per sq. in. higher than the air pressure in said first flow.

19. In an apparatus for cooling fluidized solid particles, a chamber having an inlet aperture at the top at one end and an outlet aperture at the bottom at the opposite end, an elongated aerating means disposed in said chamber below said inlet aperture, a plurality of spaced-apart cooling cells disposed within said chamber generally parallel to the direction of flow of said fluidized solid particles, each of said cells being of much greater length and width than thickness, means for venting each said cell to the atmosphere, a pipe for cooling fluid disposed within each said cell and adjacent the top thereof, each said pipe having apertures in the upper surface, an outlet pipe at the bottom of each said cell, means for vibrating each said cell, an aerating means disposed over substantially the entire bottom of said chamber, and a series of alternately upwardly and downwardly extending baffles disposed between each pair of cells and transverse to the direction of flow of said fluidized particles to effect flow of said fluidized particles in a circuitous path, the ends of said baffles being of successively decreasing vertical distances above the bottom of said chamber in the direction of flow of said fluidized particles to facilitate said flow.

References Cited in the file of this patent

UNITED STATES PATENTS

| | | |
|---|---|---|
| 2,629,938 | Montgomery | Mar. 3, 1953 |
| 2,824,723 | Turney et al. | Feb. 25, 1958 |
| 2,864,588 | Booth et al. | Dec. 16, 1958 |
| 2,876,975 | Short | Mar. 10, 1959 |